2,853,323
CERAMIC SEAL

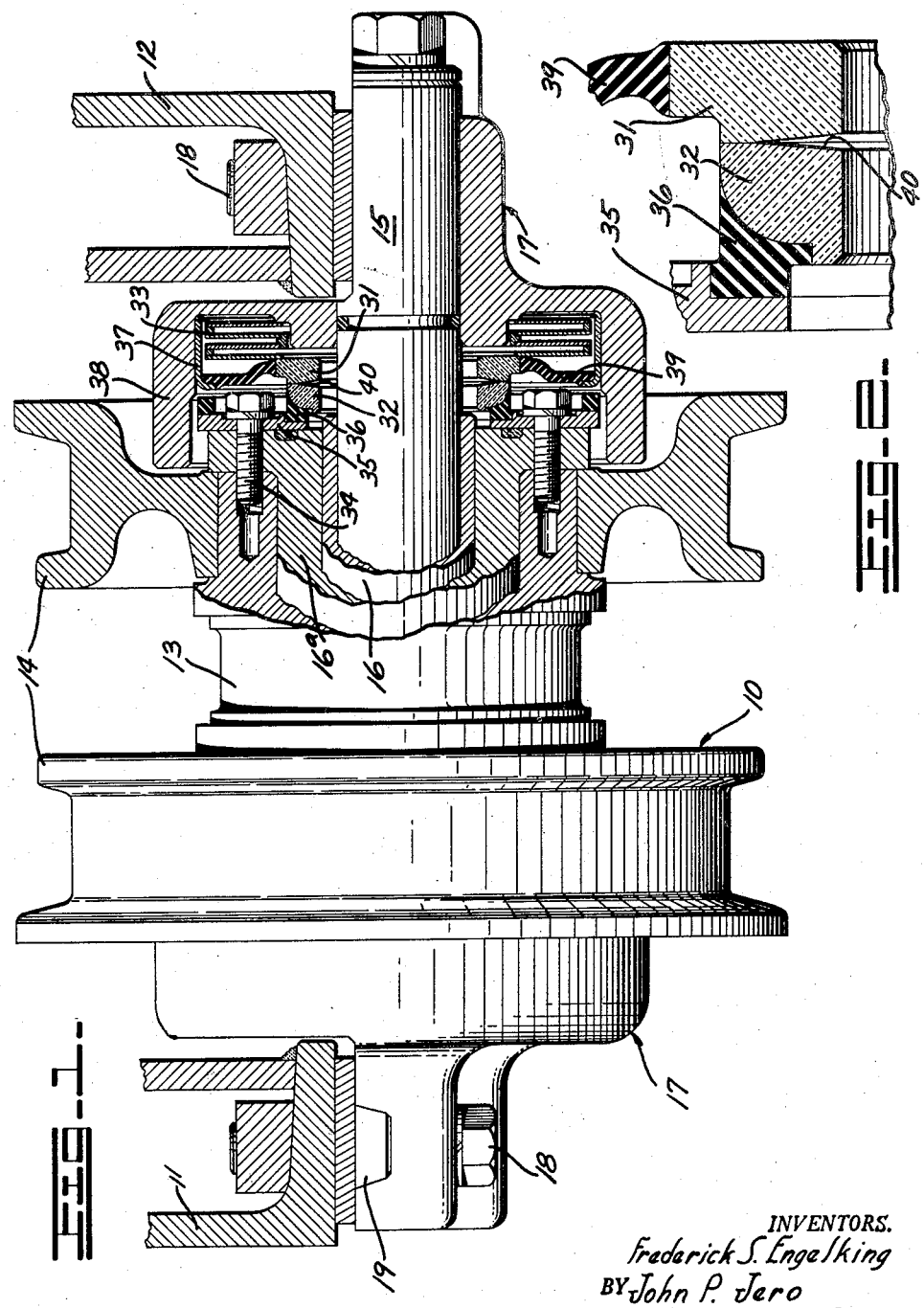

Frederick S. Engelking, Peoria, and John P. Jero, Peoria Heights, Ill., assignors to Caterpillar Tractor Co., Peoria, Ill., a corporation of California Application March 16, 1955, Serial No. 494,618

2 Claims. (Cl. 286—11.14)

This invention relates to seals of the kind employed for retaining lubricant in and excluding foreign abrasive substances from the vicinity of bearing surfaces between relatively moving parts as for example the bearings of a wheel.

This application is a continuation in part of our co-pending application for "Ceramic Seal," filed September 25, 1952, Serial No. 311,508, and now abandoned.

Conventional seals include those made of soft compressible materials which maintain sealing contacts through an inherent resiliency or through some auxiliary resilient means and also seals of hard material such as metal wherein accuracy of fit by the contacting surfaces provides the required sealing. An example of the latter type seal is shown in our assignee's United States Patent No. 2,480,908, issued to J. M. Davies on September 6, 1949, entitled "Seal." The seal shown in said patent is of the so-called metal to metal type wherein two steel rings operate in face to face contact. The contacting faces are precisely ground to prohibit the entrance of foreign matter between them from without and to prohibit the escape of all but a very small amount of lubricant from within. The escaping lubricant is intended to be just sufficient to provide effective lubrication for the contacting faces. This metal to metal type seal has proven generally satisfactory in operation even in environments where abrasive substances are present in large quantities. However, in some installations, such for example as the track rollers of a track type tractor where the seals must operate in mud, sand, and other highly abrasive substances, an abrasive particle will occasionally enter between the contacting faces of the seal. The hardest of the abrasive substances encountered is usually silica and since silica is much harder than any metal, it will scratch or score the steel of the contacting seal faces producing a condition that admits further quantities of abrasive particles which quickly destroy the seal.

The present invention contemplates the use of substances with a particle hardness greater than that of silica for the manufacture of contacting seal parts so that the seal cannot be scratched or scored by hard particles normally encountered in the environment of operation. To the contrary, the harder seal faces will so grind or disintegrate such a particle as to render it harmless to the seal or even to the protected bearing surfaces.

It is, therefore, the object of this invention to provide a low cost seal having contacting seal parts of material harder than any that would ordinarily be encountered in the environment in which the seal operates. A further object of the invention is to provide seal parts of a hard ceramic material.

Another object of the invention is to provide seal parts in face to face contact of a material that will grind or disintegrate hard particles entering between them so as to prohibit the possibility of such particles having a harmful effect upon bearings protected by the seal.

Still further and more specific objects and advantages of the invention are made apparent in the following specification wherein reference is made to the accompanying drawings showing the invention in one of its preferred forms.

In the drawing:

Fig. 1 is a view in elevation of a track roller for a track type tractor with parts in section to disclose the construction and arrangement therein of a seal embodying the present invention, and Fig. 2 is an enlarged transverse section of the contacting seal parts illustrated in Fig. 1.

The track roller shown in Fig. 1 is generally indicated at 10 and this roller is of the kind employed on a track type tractor in which an endless track is continuously laid upon the ground by a driving sprocket which also drives the tractor while its weight is supported by rollers like that shown at 10. These rollers ride over suitable track elements (not shown) on the endless track referred to. The roller 10 is one of several all supported for operation as between frame members shown at 11 and 12. A pair of these members is disposed at each side of the tractor in the conventional manner. The roller 10 comprises a hollow hub 13 and track engaging rims 14 securely fitted to opposite ends of the hub. A non-rotatable shaft 15 extends through the hub. The roller rotates about the shaft with the aid of any suitable bearing means such, for example, as bushings illustrated at 16 and 16a. The shaft 15 is secured at its opposite ends to the track frame members 11 and 12 by collars shown at 17 secured in place as by cap screws 18. One of the collars may be provided with a key 19 registering with a recess in the shaft to hold the shaft against lateral displacement.

The interior of the hub 13 has space (not shown) to provide a reservoir for bearing lubricant and seals are provided to prevent the escape of this lubricant as well as to prevent the entrance of foreign substances toward the bearings and lubricated area. Such a seal is provided at each end of the hub and each seal comprises a pair of annular sealing rings 31 and 32 with engaging relatively rotatable faces pressed into sealing engagement with each other by resilient pressure means, such as a spring assembly indicated at 33. The assembly 33 engages the outermost sealing ring 31 to urge it into sealing contact with the opposed sealing ring 32. The ring 32 rotates with the roller and is connected to the bushing 16 as well as to the roller hub by cap screws 34 entering through a plate 35 to which the ring 32 is connected as by a resilient ring 36 of rubber or similar flexible material. The ring 36 is preferably bonded to the ring 32 as well as to the metal plate 35 to provide a durable structural connection as well as one that is fluid tight to prevent the escape of lubricant. The ring 31 is connected to an annulus 37 pressed into a suitable bore in an enlarged part of the cap 17. This part of the cap 17 also extends, as shown at 38, inwardly of the rim portion 14 of the roller to act as a shroud prohibiting the entrance of rock or other large particles to the vicinity of the seal.

The seal rings 31 and 32 are illustrated in enlarged section in Fig. 2 and are constructed of a ceramic material with a particle hardness greater than the hardness of substances which might ordinarily be encountered in sand, mud or other material in which the rollers operate. Since silica is the hardest component found in such materials and has a hardness of approximately 7 on the Mohs scale of hardness, the particle hardness of the ceramic rings should be greater than 7 and preferably at least 7½ on the Mohs scale of hardness. There are many ceramics suitable for this purpose and it has been found, for example, that ceramics composed of powdered metal oxides and certain carbides will serve.

One particular ceramic material that has proven successful is aluminum oxide. For manufacturing convenience it is desirable to employ small quantities of other materials which tend to reduce the fusing or melting temperature of the principal material. Various silicates, carbonates, and oxides may be employed for this purpose. The following formula is given as a specific example of a material that has been successfully tested:

| | Percent |
|---|---|
| Aluminum oxide | 92 |
| Magnesium zirconium silicate | 1.5 |
| Barium carbonate | 1.5 |
| Aluminum silicate | 3.0 |
| Chrome oxide | 2.0 |

Such material is compressed in a mold of the required shape and then fired in a temperature of approximately 3000° Fahrenheit.

It has also been found that a ceramic formed of 100% aluminum oxide is satisfactory for forming the seal parts of the present invention. Such a ceramic has the disadvantage that it requires a somewhat higher temperature for fusing the powdered material into the required shape but it is even harder and more durable as a seal part than the material of the above formula. As a consequence of the use of such a material as a seal element any particle which is a component of mud or sand which becomes accidentally introduced between the contacting seal faces will not scratch or score these faces and if permitted to remain there during relative movement of the seal parts will itself become powdered and thus rendered harmless. It is also permissible that the ceramic material of which the seal parts are made have a limited percentage of porosity so that the contacting faces even though ground flat to extremely high tolerances will contain minute pits resulting from the innate porosity of the material which may become depositories for the finely ground silica particles.

Each of the seal elements 31 and 32 is an annulus of generally rectangular cross section though, as illustrated in Fig. 2, this cross section is slightly modified to meet structural considerations of the particular seal assembly illustrated. The contacting faces of the seal elements may be finished perfectly flat for sealing efficiency, or at least, flat within the practical limitations of machines employed in the grinding and lapping operations. In order to reduce the area where perfection of grinding is required as well as for other reasons that will presently appear, it is sometimes desirable to taper the facing sides of the seals away from each other slightly to provide a V-shaped space such as is illustrated at 40 in Fig. 2.

If the ceramic elements 31 and 32 are slightly porous they will admit the seepage or passage of a small quantity of lubricant through them and thus insure lubrication of their contacting faces without permitting the leakage or escape of any substantial quantity of lubricant. The percentage of porosity of the ceramic material may vary depending upon the nature of the lubricant used and depending upon the mechanical structure of the seal. With a mechanical structure such as that illustrated in Fig. 2, that is with a relatively large portion of the external surfaces of the seal rings covered by the rubber supporting elements 36 and 39 and with a lubricant comparable to SAE No. 30 lubricating oil, it is found that a porosity as high as 15% may be tolerated while a porosity as low as 3% will permit the passage of oil in sufficient quantities to lubricate the contacting surfaces of the bearings. The percentage of porosity referred to is, of course, a measurement of interconnecting pores as compared to the total mass of the seal ring structure. Since high porosity detracts from the physical strength of the seal elements, it is most desirable to maintain a porosity near or only slightly above that required for lubrication. However, ceramic seal rings with zero porosity rendering them impervious to the lubricant have been tested with satisfaction where the V-shaped space 40 is employed between the seal elements as this space appears to perform the function of inducing a small quantity of oil to enter between the contacting faces. Furthermore, the surface of the ceramic material, even though it is not porous may have minute pits which receive and retain a sufficient quantity of lubricant. This characteristic of the material also aids in the grinding action on particles which may find their way between the seal surfaces. The proportions of the V-shaped space are exaggerated in the drawings. In actual practice, it may be as small as one or two hundred millionths of an inch at its greatest width and may taper to zero in a space of approximately ¼ inch. A space of these dimensions between the facing surfaces of the seal elements aids in directing lubricant to between the contacting faces. Furthermore, the provision of this space reduces the area of the contacting faces and results in higher unit area pressure between the seal elements to prevent the escape of lubricant.

It is an advantage of the seal herein described that undesirable particles are not only excluded with efficiency equal to or better than that of existing seals but in addition the seal structure is in effect a grinding mill so that any accidentally introduced particle is rendered harmless by the grinding action of the seal faces. Furthermore, even though many seals are highly efficient in the rejection of such particles from the outside, the seal may be destroyed by particles from the inside introduced at the time of assembly, in field lubrication, or originating as wear products from bearings and other parts within the lubricated area. With the present seal structure abrasive particles from within are destroyed as readily as those from without. In actual tests the admission of large quantities of silica bearing mud between the ceramic seal parts has proved harmless and acted to produce a high polish on the protected bearing parts without producing a measurable difference in their dimensions.

One of the salient advantages of the seal herein described is the low cost of the components of the ceramic material, many of which are abundant and capable of manufacture into a variety of shapes in which hardness, porosity and other qualities are readily controlled by well-known inexpensive manufacturing processes.

We claim:
1. Seal elements with contacting relatively rotatable flat annular seal faces formed of ceramic material of particle hardness exceeding 7 on the Mohs scale of hardness.

2. Seal elements of the character described having relatively rotatable annular surfaces in face to face sealing contact formed of ceramic material exceeding 7 on the Mohs scale of hardness and having minute pits in their contacting faces to retain lubricant between said faces and to induce a grinding action upon foreign particles entering between the faces when they are in relative movement.

References Cited in the file of this patent

UNITED STATES PATENTS

| | | |
|---|---|---|
| 2,253,969 | Dawihl | Aug. 26, 1941 |
| 2,279,167 | Jackson | Apr. 7, 1942 |
| 2,391,577 | Larson | Dec. 25, 1943 |
| 2,425,209 | Snyder | Aug. 5, 1947 |
| 2,480,908 | Davies | Sept. 6, 1949 |
| 2,571,526 | Bonnet | Oct. 16, 1951 |
| 2,602,709 | Wheildon | July 8, 1952 |
| 2,650,841 | Meyer | Sept. 1, 1953 |
| 2,770,477 | Rankin | Nov. 13, 1956 |